United States Patent [19]

Hammarstrand

[11] 3,942,322

[45] Mar. 9, 1976

[54] DEVICE IN HYDRAULIC PERCUSSION TOOLS

[75] Inventor: Sten Ove Hammarstrand, Hudiksvall, Sweden

[73] Assignee: Svenska Hymas Aktiebolag, Hudiksvall, Sweden

[22] Filed: Oct. 18, 1974

[21] Appl. No.: 515,926

[30] Foreign Application Priority Data
Oct. 23, 1973 Sweden .......................... 73143919

[52] U.S. Cl. ...................... 60/371; 91/218; 91/290
[51] Int. Cl.² ...................... F15B 1/02; F15B 11/15
[58] Field of Search ............. 60/369, 371, 378, 413, 60/414; 91/218, 265, 277, 290

[56] References Cited
UNITED STATES PATENTS

| | | | |
|---|---|---|---|
| 1,594,217 | 7/1926 | Smith | 91/290 X |
| 2,802,336 | 8/1957 | Ball | 60/371 |
| 3,412,646 | 11/1968 | Johnston | 91/290 X |

Primary Examiner—Edgar W. Geoghegan
Attorney, Agent, or Firm—Kurt Kelman

[57] ABSTRACT

A percussion tool is hydraulically operated by a piston whose stroke is controlled by a spring biased valve. A pressure accumulator is connected to the working pressure chamber of a hydraulic cylinder and receives pressure therefrom during the return stroke of the piston while discharging pressure during the working stroke. A piston is displaceably mounted in the pressure accumulator for movement into an end position when the pressure is discharged and a second valve is actuated by the piston in the end position to control the spring biased valve.

5 Claims, 3 Drawing Figures

DEVICE IN HYDRAULIC PERCUSSION TOOLS

The invention refers to an improvement in hydraulic percussion tools.

Hydraulic percussion tools, for rock drilling, breaking or the like of known construction have a reciprocating working piston in a cylinder, driven by a pressure liquid, usually hydraulic oil, during the reciprocating movement. The pressure liquid is usually supplied from a continuously operating hydraulic pump and is fed pulsewise into the cylinder via valve means at a rate corresponding to the desired percussion frequency of the working piston. The impact energy of the working piston is transferred to an exchangeable tool arranged co-axially with the piston and having the shape of a rock drill, breaker or the like.

In percussion tools of this kind it is desirable to enable variation of the piston stroke within comparatively large limits. A given impact frequency answers purely physically to each stroke. It is therefore natural and in practice as good as necessary to let the movement of the working piston regulate the valve means for the pressure pulses to the cylinder.

An example of such a solution is described in Swedish Pat. No. 354,029. In this construction the valve means consists of a four-way slide valve having two discharge ducts connected respectively to a cylinder chamber on each side of the working piston, an inlet duct for the pressure oil and an outlet duct for return oil from the cylinder. When the working piston after a return movement has reached a turning point, it coacts with a pressure oil cylinder whereat the slide is set from a first position where the working piston makes a movement towards impact. Return of the slide from this second position to the first position for the working piston return movement is actuated by means of a pressure spring biassed against the opposing pressure caused by the pressure oil cylinder. This opposing pressure which must be reduced to a certain low value in order that the compression spring shall be capable of resetting the slide is determined in its turn by the outflowing speed and pressure of the return oil from the valve means. Regulation, i.e., adapting the slide resetting to a rate corresponding to the impact frequency of the piston (i.e., indirectly to the stroke) is limited in this device to variation of the dynamic pressure from the outgoing return oil.

Practical experience has shown that there are certain disadvantages with this construction. For example, the outflowing speed of the return oil is dependent on the impact frequency (stroke). Moreover, variations in the oil viscosity can cause alterations in the flow pressure which, in their turn, effect the resetting of the slide. Adjustment of the slide operation is therefore not so simple and positive as is required in the practical use of a tool of the kind in question.

According to the present invention, a device is provided for the regulation of the slide operation which produces a complete and positive resetting of the slide completely independently of the return oil. The invention is applicable to the kind of percussion tool as described in the above mentioned patent, but can also be applied to similar devices which are constructed according to the same principle, i.e. with a reciprocating working piston obtaining pressure pulses via a 4-valve. According to the invention, the necessary opposing pressure reduction for the slide is achieved by means of a special valve means, so that the slide can be moved from the second position to the first position by the pressure spring, the valve means being reset so that the opposing pressure to the slide is momentarily reduced at a definite position of the working piston. An instantaneous readjustment of the slide is thereby obtained at a predetermined and completely unaffected point of time in the cycle, so that a positive slide operation is obtained independent of the impact frequency of the working piston, and identical initial conditions for the working cycle are obtained.

The distinguishing features of the invention are defined in the claims.

By way of example, an embodiment of the invention is described hereinafter, with reference to the attached drawing.

The components of the hydraulic percussion tool according to the invention are purely schematically illustrated. In practice, the components are built into a compact unit which can be placed on the boom of a trenching machine or the like and are directed towards the point which is to be worked on. The pipe lines shown in the Figures are suited to the constructional design of a percussion tool.

Figure 1:
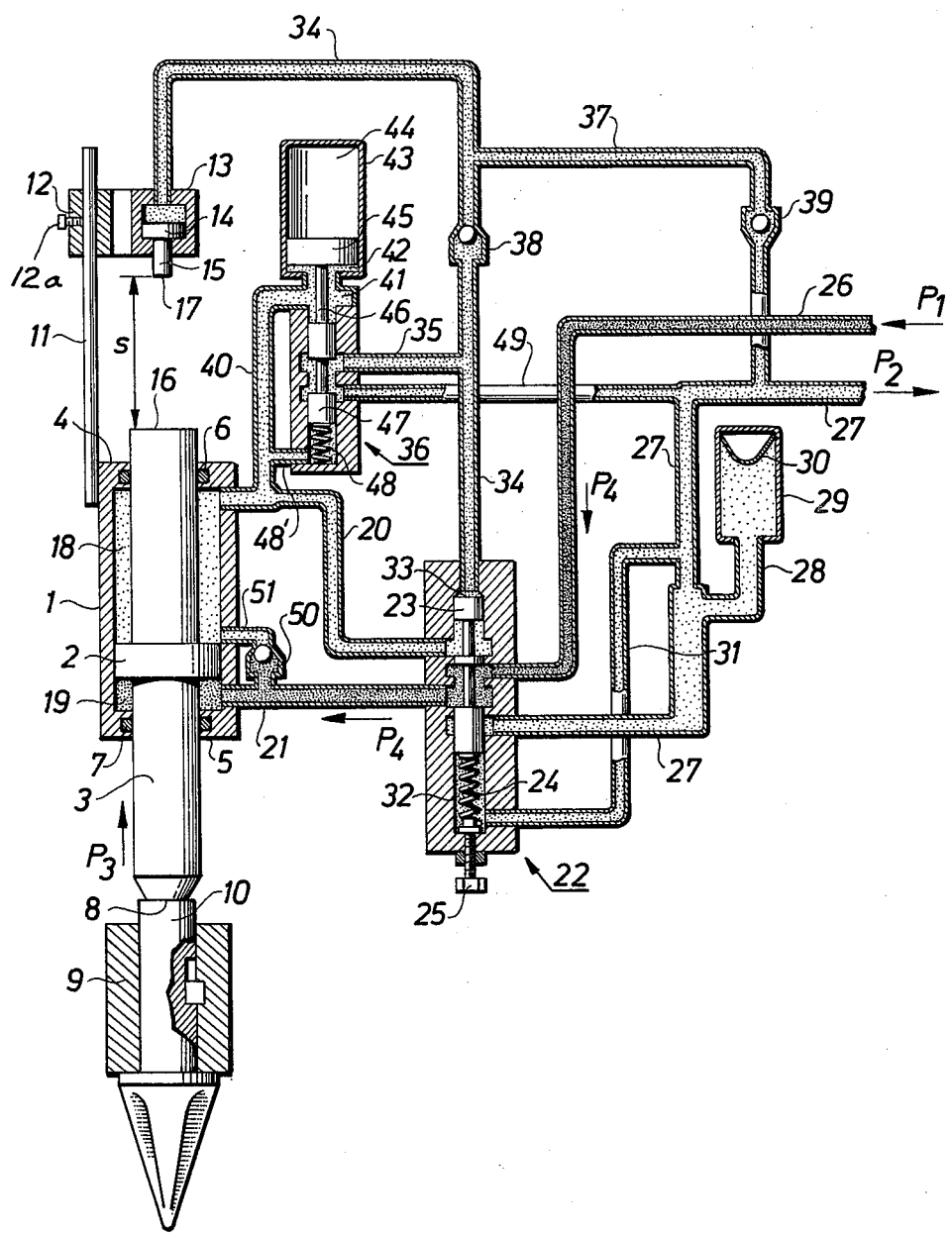
FIG. 1 shows a hydraulic circuit diagram for a hydraulic percussion tool with a piston reciprocating in a cylinder and actuated by oil pressure via a first valve means in which a slide is positionally set by a second valve means according to the invention, the piston being shown in a first position.

The drawing shows reciprocating piston 2 with piston rod 3 arranged in cylinder 1. The cylinder 1 has heads 4,5 through which piston rod 3 passes sealed by sealing rings 6,7. In a lower position, when the piston 2 has completed a working stroke, a lower end surface 8 of the piston rod 3 strikes against a percussion tool 10, e.g. a breaker or the like. The percussion tool is arranged movably lengthwise in holder 9. Support rod 11 is affixed to the end of the cylinder 1 which is opposite to that at the percussion tool 10 and displaceably carries a holder 12 with an operating cylinder 13. The holder 12 and cylinder 13 may be held in position on rod 11 by fixing means, such as set screw 12a. A piston 14 with piston rod 15 reciprocates in the operating cylinder 13. FIG. 1 shows the position of working piston 2 when the lower end surface 8 of piston rod 3 strikes against the percussion tool 10, there being a distance S between an upper end surface 16 of the piston rod 3 and a lower end surface 17 of the piston rod 15.

The cylinder 1 has an upper or working pressure chamber 18 and a lower or return pressure chamber 19, which are connected by ducts 20,21 to a first valve means generally designated by 22 and which regulates the pressure on working piston 2.

A slide 23 operable by a pressure spring 24 is arranged in slide valve 22. The bias of the pressure spring 24 can be regulated by means of an adjusting screw 25. Illustrated slide valve 22 is of the 4-way type with a pipe 26 for supply of pressure oil and a pipe 27 for return of the oil. The arrows p1,p2 indicate the flow direction for the pressure oil through the pipe 26 and the direction for returning oil from pipe 27, the pipes 26,27 being connected to a pressure oil system not shown. A receptacle 29 is connected to the pipe 27 by a branch pipe 28, the chamber of the receptacle 29 being provided with a means which is respectively expandable and compressible, e.g., a rubber bladder 30 filled with gas under pressure. The receptacle 29 serves the function of a levelling accumulator for pressure peaks in the oil flowing out through the pipe 27 from chamber 19 of the cylinder 1.

A branch pipe 31 further connects valve chamber 32 for the pressure spring 24 in the valve means 22 with the pipe 27. The branch pipe 31 has the task of transferring any oil leaking past the slide 23 to the pipe 27 so that no excess pressures disturbing the valve function occur in the chamber 32, i.e. under the slide 23.

Opposite valve chamber 33 of valve means 22 is connected with the operating cylinder 13 via a pipe 34. A first branch 35 connects pipe 34 to a second and for the invention characterizing valve means generally designated by 36, and a second branch pipe 37 connects the pipe 34 with the pipe 27 for the return oil. Check valve 38 is arranged on pipe 34, between branch pipes 35,37 to prevent oil flow in the direction of the operating cylinder 13. In a similar manner the branch pipe 37 has a one-way valve 39 mounted in it so that a flow in the direction from the operating cylinder 13 to the pipe 27 is prevented. The function of the one-way valves 38,39 is dealt with more fully hereinafter.

Duct 20 is shown connecting the valve means 22 with the chamber 18 in cylinder 1, there being a branch pipe 40 connected to a chamber 41 in the second slide valve 36, chamber 41 being in direct communication with lower chamber 42 of a pressure accumulator 43 having an upper chamber 44. A piston 45 with a piston rod 46 operates in the pressure accumulator 43. The upper accumulator chamber 44 is suitably filled with a gas which is inert in relation to the pressure oil used, and which may be under a certain excess pressure.

The second valve means 36 has slide 47 operated by a pressure spring 48. The chamber in which the spring 48 is arranged is in communication with the pipe 40 by a pipe 48', whereby there is always the same pressure on both sides of the slide 47. Apart from the previously mentioned branch pipe 35 connecting the valve means 36 with the pipe 34, the valve means 36 is also connected by the pipe 49 to the pipe 27 for the return oil.

Check valve 50 is arranged in a shunt pipe 51 which at a lower position of piston 2 shown in FIG. 1, connects the upper chamber 18 in cylinder 1 with the pipe 21 for the return oil from the lower chamber 19. The one-way valve 50 is so directed that it allows oil to be discharged from the chamber 18 to the pipe 21 but prevents flow in the opposite direction.

Figure 2:
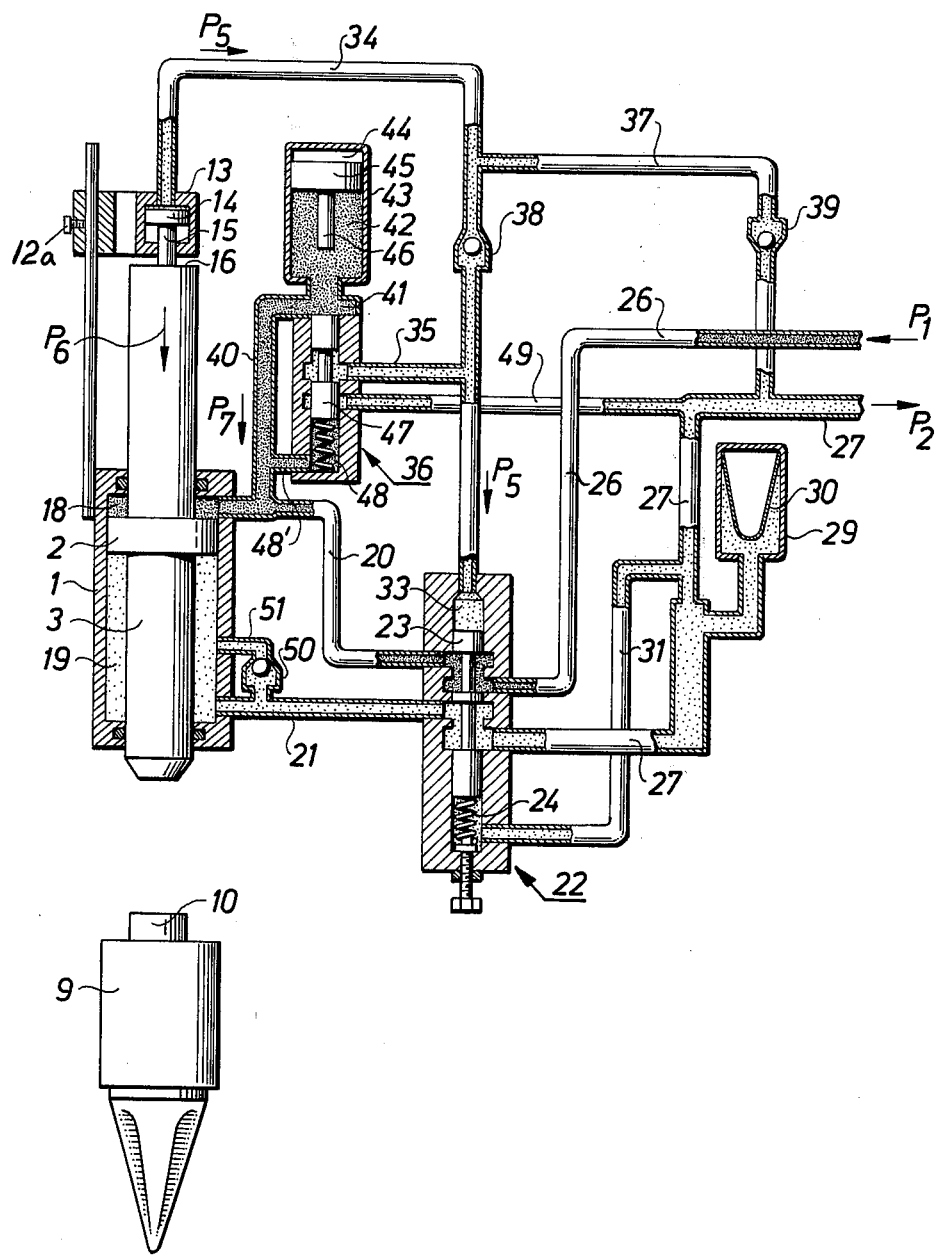
FIGS. 2 and 3 show the diagram according to FIG. 1, with the piston in a second and third position, respectively.
Figure 3:
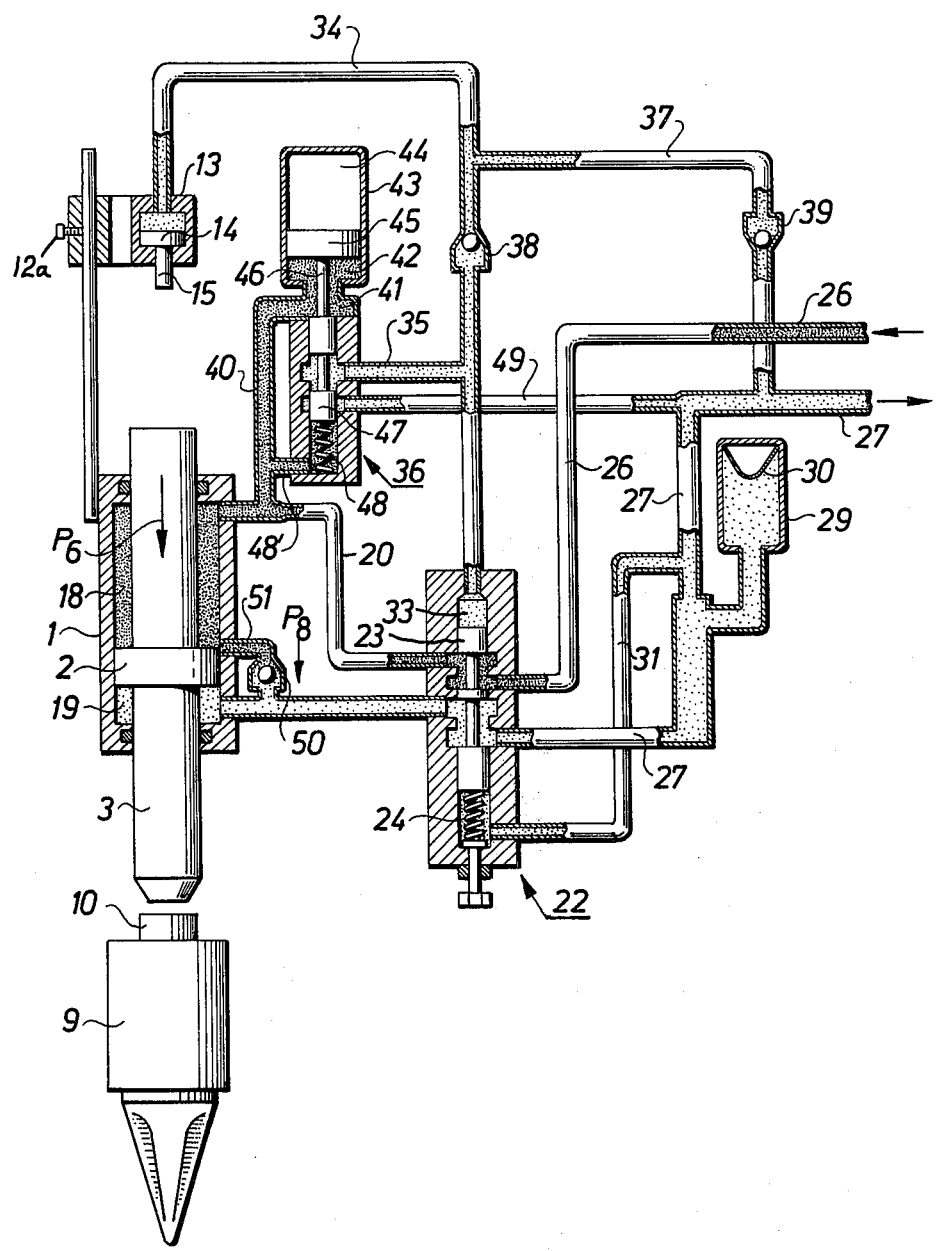

FIGS. 1–3 show three different operational phases for the described device, with the different moving portions shown in the positions corresponding to the respective operational phase. The pressure oil in the pipes has been denoted by dots, a smaller distance between the dots indicating higher volume pressure.

In the following description of the operation, the upper and lower positions of certain parts are referred to, which positions refer to those shown on the drawing.

FIG. 1 shows a first operational phase, in which the piston 2 with the piston rod 3 has just imported a blow against the tool 10 and is ready for a return movement according to the arrow P3. The slide 23 in the valve means 22 is then in an upper position so that the pressure oil can flow via the valve means 22 to the lower chamber 19 in the cylinder 1 through the pipes 26,21 according to the arrows P4. The slide 47 in the valve means 36 is in a lower position, which means that the pipe 35 is in communication with the pipe 49 and thereby also with the pipe 27 for the return oil. This means that the oil pressure in the chamber 33 of valve 22 above the slide 23 is the same as for the return oil and the same as in chamber 32. The one-way valve 50 is automatically closed by the pressure from the oil supply in pipe 21, so that no oil flow can take place through the shunt pipe 51 to the chamber 18.

It should be noted that in the position shown in FIG. 1, the piston 14 in the operating cylinder 13 as well as the piston 45 in the pressure accumulator 43 are in their lower position. The piston rod 46 of the piston 45 thereby keeps the slide 47 in the valve means 36 pressed down in the previously mentioned lower position. The rubber bladder 30 in receptacle 29 is compressed by the immediately preceding flow of oil from the chamber 19.

The upper position of the slide 23 in the valve means 22 also causes, as may be seen from FIG. 1, the chamber 18 above the piston 2 as well as all chambers are pipes in communication with it to be closed.

When the piston 2 under the influence of the oil pressure in the chamber 19 moves upwards according to the arrow P3, a displacement of the oil from the chamber 18 via the pipe 40 and the chamber 41 to chamber 42 takes place, whereby piston 45 is pressed upwardly in the pressure accumulator 43 while compressing the pre-pressurized gas enclosed in the chamber 44. As the piston rod 46 of the piston 45 moves away from the slide 47, the slide is pressed by the pressure spring 48 to an upper position so that the communication between pipes 35,49 is interrupted.

When the piston rod 3 has reached an upper turning point, FIG. 2, the upper end surface 16 of the piston rod 3 contacts piston rod 15 and presses piston 14 in the operating cylinder 13 into an upper position. Oil above the piston 14 has thereby been pressed through the pipe 34 past the one-way valve 38 into chamber 33 in the valve means 22, and has pressed down the slide 23 to a lower position at which the upper chamber 18 in cylinder 1 is put into communication with the pressure oil pipe 26 via the valve means 22 and pipe 20. At the same time, the lower chamber 19 is put into communication with the pipe 27 for the return oil and thereby also with receptacle 29 via the pipe 21 and the valve means 22. It should be noted from FIG. 2 that the rubber bladder 30 in receptacle 29 has expanded during the upward movement of the piston 2 due to the return flow of oil through the pipe 27.

When slide 23 has assumed its lower position, pressure oil is supplied to the chamber 18 above the piston 2 through supply pipe 26 and duct 20, and this begins a downward movement according to the arrow P6. The oil collected in the pressure accumulator 43 during the upward stroke of the piston 2 is now under the same or higher pressure than the pressure oil supplied via pipe 26, and thus contributes to the downward movement of piston 2 by flowing to the chamber 18 through the pipe 40 according to the arrow P7. At the same time, the piston 45 in the pressure accumulator 43 moves downwardly, until in an end position, the piston rod 46 engages slide 47 in the valve means 36 (see FIG. 3) and pushes the slide to a lower position while piston rod 3 simultaneously strikes the tool 10 and the piston 2 exposes the pipe 51 for discharge of oil from chamber 18.

FIG. 3 shows a momentary position in which the slide 23 in the valve means 22 is still in the lower position and the piston 45 in the pressure accumulator 43 has pressed the slide 47 downwards in the valve means 36 toward a position in which the pipes 35,49 begin coming into communication with each other. At approximately this position, the piston 2 has come so far down in the cylinder 1 that the shunt pipe 51 is beginning to be exposed, which means that the excess oil from the chamber 18 flows past the one-way valve 50 according to the arrow P8. This oil, as well as the amount of oil which was displaced from the chamber 19 during the downward movement of the piston 2, has to some extent been accumulated in receptacle 29, compressing the rubber bladder 30 while the remaining amount of oil has flowed out through the pipe 27.

When the piston 45 in the pressure accumulator 43 has pushed slide 47 in the valve means 36 to the final lower position, the pipes 35,49 have come into complete communication with each other. The pressure oil in the chamber 33 in the valve means 22 then flows through pipe 34, brand pipe 35 and via the valve means 36 and pipe 49 into the pipe 27 for return oil. At the same time, the slide 23 in the valve means 22 is pressed into the upper position by the compression spring 24. At this juncture, the piston 14 is pressed back into its lower position by oil from the pipe 27 via the valve 39 and pipes 37 and 34. On the other hand, the one-way valve 39 prevents a direct flow of oil to the pipe 27 when the piston 14 is pressed upward for resetting the slide 23 in the valve means 22.

This means that the initial position according to FIG. 1 is reattained and that the piston 2 with attached piston rod 3 once again starts its upward movement according to the arrow P3 and that the described cycle of movement is repeated.

The one-way valve 38 has the task of closing the pipe 34 so that oil from the chamber 33 in the valve means 22 can flow directly into the pipe 27 via the pipes 35,49 through valve means 36.

Thus valve means 36 according to the invention provides resetting of the valve means 22 from a lower position to an upper position for the slide 23 at exactly the right moment, i.e. just when the piston 2 is at a lower position. Resetting the valve means 22 takes place completely independently of the flow conditions for the return oil, and no special adjustment of the valve means 36 to the piston stroke S need to be made. The same resetting, exact and correct in time, of the valve means 22 takes place completely automatically at all strokes and impact frequences respectively, while emptying the pressure accumulator 43 to continuously the same initial conditions is ensured.

Furthermore, the valve means 36 may constitute a standard component, and it can be built into the unit in a simple way with the remaining parts of the percussion tool.

The valve means 36 has been described and illustrated in the form of a slide valve. However, it is quite clear that a suitably designed globe valve or other like valve means can also be used.

In order to alter the impact frequency in a simple manner, instead of making the cylinder device 12–15 adjustable, distance pieces of different length can be inserted between the engaging surfaces 16 and 17 along the rod 11.

The percussion tools according to the invention can, apart from the mentioned applications for rock drilling, breaking etc. also be used within the workshop industry, e.g. for cutting heavy blanks, shearing plates, hammering, chiseling and the like.

What I claim is:

1. An arrangement for hydraulically operating a percussion tool and the like, comprising
   1. a cylinder and a piston reciprocable therein through a working stroke and a return stroke, the piston dividing the cylinder into a working pressure chamber and a return pressure chamber,
   2. a first, spring-actuated valve means controlling the strokes of the piston,
   3. a pressure accumulator connected to the working pressure chamber of the cylinder, the accumulator receiving pressure from the working pressure chamber during the return stroke and discharging the pressure during the working stroke,
   4. a member displaceably mounted in the pressure accumulator for movement into an end position when the pressure is discharged from the pressure accumulator, and
   5. a second valve means actuated by the displaceable member in the end position thereof to control the first valve means so that the first valve means causes the piston to perform the return stroke.

2. The arrangement of claim 1, comprising a pressure line between the second and first valve means, a slide in the second valve means, a compression spring moving the slide into a valve closing position, and the displaceable member moving the slide into a valve opening position in the end position of the displaceable member to supply pressure through the pressure line and control the first valve means.

3. The arrangement of claim 2, wherein the displaceable member is a piston having an attached piston rod, the member being arranged for coaction of the piston rod with the slide in the end position of the member.

4. The arrangement of claim 1, wherein the first valve means comprises a housing, a slide in the housing and a compression spring acting on the slide to move it in a first direction, the slide and the housing defining a chamber, and further comprising an operating cylinder, a pressure supply line including said pressure line connecting the operating cylinder to the chamber in the first valve means, the operating cylinder being arranged to deliver a pressure pulse to said chamber through the pressure supply line to counteract the compression spring acting on the slide of the first valve means in response to the return stroke movement of the piston, a first branch line connecting the pressure supply line to the second valve means, a return line connected to the return pressure chamber, a second branch line connecting the return line to the second valve means, and said chamber being in communication with the return line through the branch lines when the second valve means is in the open position thereby eliminating any excess pressure in the chamber caused by the pressure pulse and permitting the compression spring to move the slide in the first direction.

5. The arrangement of claim 4, further comprising a check valve in the pressure supply line between the first branch line and the operating cylinder, the check valve being arranged to prevent pressure flow in the direction of the operating cylinder.

* * * * *